United States Patent [19]

Morris

[11] Patent Number: 5,063,734

[45] Date of Patent: Nov. 12, 1991

[54] METHOD FOR PROVIDING REAL-TIME CONTROL OF A GASEOUS PROPELLANT ROCKET PROPULSION SYSTEM

[75] Inventor: Brian G. Morris, Houston, Tex.

[73] Assignee: The United States of America as represented by the Administrator of the National Aeronautics and Space Administration, Washington, D.C.

[21] Appl. No.: 470,480

[22] Filed: Jan. 26, 1990

[51] Int. Cl.$^5$ ............................................. F02K 9/58
[52] U.S. Cl. ...................................... 60/204; 60/240; 60/243; 60/259
[58] Field of Search ................ 60/204, 240, 243, 259, 60/39.27, 257; 137/88, 98, 100, 101.19; 364/431.01

[56] References Cited

U.S. PATENT DOCUMENTS

| | | | |
|---|---|---|---|
| 2,995,008 | 8/1961 | Fox | 60/259 |
| 3,095,740 | 7/1963 | Peacock | 60/39.27 |
| 3,224,189 | 12/1965 | Kenny | 60/39.27 |
| 3,368,353 | 2/1968 | Allport | 60/243 |
| 3,400,536 | 9/1968 | Richardson | 60/259 |
| 3,520,137 | 7/1970 | Newman et al. | 60/221 |
| 3,613,375 | 6/1961 | Abild | 60/240 |
| 3,740,946 | 6/1973 | Welton et al. | 60/204 |
| 4,541,238 | 9/1985 | Scheller | 60/204 |
| 4,744,183 | 2/1988 | Rosen | 60/204 |
| 4,777,794 | 10/1988 | Nielsen | 60/211 |

Primary Examiner—Louis J. Casaregola
Assistant Examiner—John A. Savio, III
Attorney, Agent, or Firm—Hardie R. Barr; Harold W. Adams; Edward K. Fein

[57] ABSTRACT

In the representative embodiment of the new and improved methods and apparatus disclosed herein to provide effective real-time management of a spacecraft rocket engine powered by gaseous propellants, real-time measurements representative of the engine performance are compared with predetermined standards to selectively control the supply of propellants to the engine for optimizing its performance as well as efficiently managing the consumption of propellants. A priority system is provided for achieving effective real-time mangagement of the propulsion system by first regulating the propellants to keep the engine operating at an efficient level and thereafter regulating the consumption ratio of the propellants. A lower priority level is provided to balance the consumption of the propellants so significant quantities of unexpended propellants will not be left over at the end of the scheduled mission of the engine.

8 Claims, 2 Drawing Sheets

METHOD FOR PROVIDING REAL-TIME CONTROL OF A GASEOUS PROPELLANT ROCKET PROPULSION SYSTEM

ORIGIN OF THE INVENTION

The invention described herein was made by an employee of the United States Government and may be manufactured and used by or for the Government of the United States without the payment of any royalties thereon or therefor.

BACKGROUND OF THE INVENTION

1. Field of the Invention

Liquid propellants have been successfully used for many years in various types of rocket propulsion systems for many different types of spacecraft. Those with skill in the art will, of course, appreciate that, for one thing, one major advantage of liquid propulsion systems is that the control of the propellants is easily carried out either by feeding the propellants to the rocket engine from a pressurized tank or by utilizing turbine-driven pumps and control orifices in the flow lines to regulate the flow of the propellants into the combustion chamber of the engine.

For various technical reasons it has not been considered advantageous heretofore to utilize gaseous propellants such as oxygen and hydrogen in rocket propellant systems. For one thing, it will, of course, be appreciated that the real-time control of gaseous propellants being used to power a rocket engine is not an easy task even in those situations where the engine is being fired continuously. Moreover, it is recognized that real-time control of gaseous propellants is even further complicated where the rocket engine is being intermittently operated. As a result, until recently there has been little interest in developing methods and apparatus for effectively controlling gaseous propellants for powering spacecraft rocket engines. Recently, however, advances in the spacecraft art have made it worthwhile to give serious consideration toward utilizing reaction control systems that decompose water by electrolysis and then utilize the oxygen and hydrogen that are produced by the process as propellants for a spacecraft rocket engine.

Accordingly, this invention relates to new and improved methods and apparatus for providing real-time control of a gaseous-propellant rocket engine until the propellants are expended. More particularly, the present invention is related to methods and electronic control apparatus for accurately balancing the mass quantities of the gaseous propellants supplied to a rocket engine for spacecraft and insuring their optimum utilization regardless of whether the engine is to be fired continuously or is to be sequentially fired so as to carry out a series of successive operations.

2. Background Art

A typical bi-propellant rocket propulsion system for a spacecraft includes individual tanks respectively carrying a combustible fuel component and an oxidizer component which, as described above, have heretofore typically been liquids such as hydrogen and liquid oxygen. To operate the rocket engine, these liquids are fed to the engine either by pumps or by individually pressuring the tanks. In either event, the liquid propellants are withdrawn from their respective supply tanks and mixed just before they are introduced into the combustion chamber of the engine. To achieve optimum performance of the spacecraft, these combustible components are usually mixed in an 8-to-1 ratio (by mass) for achieving optimum performance of the rocket engine.

A typical liquid-propellant system as seen, for example, in U.S. Pat. No. 4,541,238, is arranged for measuring the flow rates of the fuel and the oxidizer being supplied to the rocket engine by turbine-driven pumps. The measurements are cooperatively correlated by way of suitable electronic control instrumentation for periodically determining the ratio of the propellants that are being introduced into the combustion chamber of the rocket engine. By comparing the computed mixture ratio with a predetermined set value, the control instrumentation cooperatively regulates the flows of the liquid propellants so as to hopefully achieve optimum utilization of the propellants during the operation of the rocket engine. The system disclosed in that patent is also cooperatively arranged to adjust the predetermined set value of the mixture ratio should subsequent measurements indicate a need for a more-efficient mixture ratio. Those skilled in the art will, however, appreciate that it is difficult, if not practically impossible, to readily evaluate or change the various control parameters of a liquid-propellant system of this nature during successive multiple-burn operations of the spacecraft engine.

Another liquid-propellant system for spacecraft is shown in U.S. Pat. No. 4,722,183 in which the mixture ratio of the liquid propellants is periodically adjusted in keeping with the amounts of the propellants which are respectively remaining in the propellant storage tanks following one or more previous operations of the rocket engine. To achieve these mixture-ratio adjustments, measurements are made after each operation of the engine to determine the quantities of the fuel and oxidizer left in their respective tanks. The pressure is then adjusted in at least one of the propellant tanks so that the fuel and oxidizer will be subsequently withdrawn from their respective storage tanks in whatever proportions are required for establishing a desired mixture ratio for the fuel and oxidizer which are supplied to the rocket engine when it is next fired. In this manner, the relative proportions of the remaining liquid propellants will be adjusted from time to time as needed for balancing the consumption of the fuel and oxidizer during the rest of the spacecraft operation.

In U.S. Pat. No. 4,777,794 a propellant flow control system for a typical spacecraft rocket engine is shown as utilizing fluid-operated, self-regulating control valves or so-called "mass flow regulators" respectively arranged to function without electrical controls. To accomplish this, these self-regulating valves are respectively provided with enclosed bellow actuators cooperatively arranged to position control elements to compensate for temperature or pressure changes that typically occur as propellants are withdrawn from their respective storage tanks. In operation, these self-regulating control valves cooperate so as to establish essentially-constant mass flow rates of the propellants as they are being supplied to the rocket engine.

It will, of course, be appreciated by those skilled in the art that a control system designed for controlling the supply of liquid propellants to a spacecraft engine is not necessarily suited for controlling gaseous propellants. For instance, with liquid-propellant control systems such as the systems described in the aforementioned patents, no attempt is made to control the pressures in the engine combustion chamber as the rocket engine is operating. Moreover, these control systems utilized for liquid propellants are simply not designed for establishing adjustable set points for the system control elements for accommodating unexpected changes in the operating parameters of the system which may take place from time to time during the operation of the engine. Furthermore, with the prior-art liquid propellant control systems, there is simply no necessity to accommodate large changes in propellant densities which will inherently occur in gaseous propellant systems.

OBJECTS OF THE INVENTION

Accordingly, it is an object of the present invention to provide new and improved methods and apparatus for achieving optimum real-time dynamic control of a rocket engine being driven by gaseous bi-propellants.

It is another object of the present invention to provide methods and apparatus for efficiently controlling a gaseous-propellant rocket engine in such a manner that the engine can be operated either continuously or at selected periodic intervals while still maintaining optimum balances of the mass quantities of the propellants as they are progressively depleted during the operation of the engine.

SUMMARY OF THE INVENTION

These and other objects of the invention are attained by new and improved methods and apparatus utilizing real-time measurements of selected operating conditions associated with a propellant system that is cooperatively arranged for supplying gaseous propellants to a rocket engine. Initial parameters are established for defining predetermined values for selected conditions considered necessary for achieving a desired performance of the engine. These system parameters are monitored at least periodically and compared with their respective predetermined values to determine whether or not the rocket engine is still operating in accordance with the preferred performance criteria. Whenever these comparisons indicate that at least one of these system parameters is no longer in accord with its initial target values, adjustments are made either for restoring the errant condition to its initial target values or for modifying the target value for that condition whenever the computations indicate correction is needed to achieve the desired performance criteria.

BRIEF DESCRIPTION OF THE DRAWINGS

The several features of the invention are set forth with particularity in the appended claims. The arrangement and practice of the invention, together with further objects and various advantages thereof, may best be understood by way of the following description of exemplary methods and apparatus incorporating the principles of the invention as illustrated in the accompanying drawings, in which:

DETAILED DESCRIPTION OF THE PREFERRED EMBODIMENT

Figure 1:
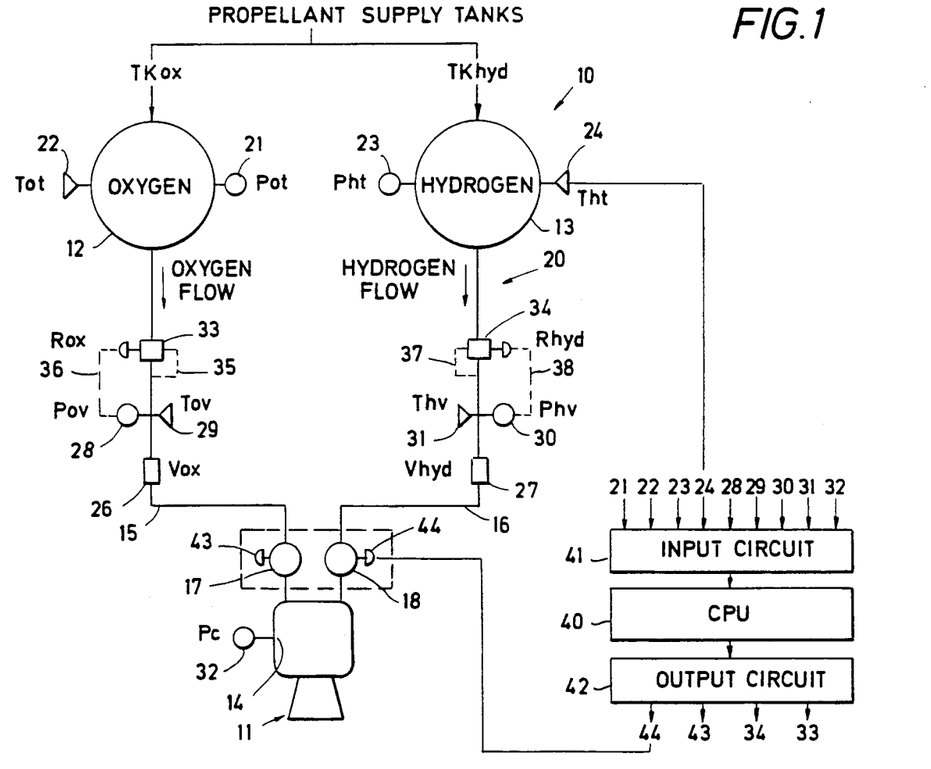
FIG. 1 schematically depicts a preferred embodiment of a gaseous-propellant system arranged in accordance with the principles of the present invention.

Turning now to FIG. 1, a new and improved propellant rocket propulsion system 10 is depicted as being arranged in accordance with the principles of the present invention for supplying a gaseous oxidizer and fuel such as, for example, oxygen and hydrogen to a typical bi-propellant rocket engine as indicated generally at 11. Storage tanks 12 and 13 are respectively arranged to store sufficient quantities of the gaseous oxidizer and fuel under appropriate temperature and pressure conditions during a predetermined operating period. As is typical, the oxidizer tank 12 and the fuel tank 13 are connected to the combustion chamber 14 of the rocket engine 11 by individual flow lines 15 and 16 of appropriate sizes and materials in accordance with the individual properties of the propellants and the anticipated service conditions for the propulsion system 10. In the preferred manner of arranging the new and improved propulsion system 10 of the present invention, additional control devices, such as a set of typical solenoid-actuated cut-off valves 17 and 18, are also respectively installed in the propellant flow lines 15 and 16 adjacent to the combustion chamber 14 of the engine 11. It will, of course, be recognized that these cut-off valves 17 and 18 are provided for cutting off the flow of propellants to the rocket engine 11 in the event of some unexpected emergency or for simply closing the flow lines 15 and 16 when the engine is not operating.

Those skilled in the art will appreciate, however, that it is difficult to control a rocket engine, such as at 11, that is driven by gaseous propellants. For example, the temperatures of gaseous propellants and, therefore, their densities will change significantly due to their expansion in the storage tanks 12 and 13 as well as in the flow lines 15 and 16. Moreover, during the operational cycle of the rocket engine 11, the changing thermal effects due to the expansion of the gases in the storage tanks 12 and 13 will be significantly different for each of the two propellant gases. These problems are, of course, greatly magnified when the rocket engines 11 is being operated intermittently; and, as a result, it may be necessary from time to time to make periodic modifications in one or more of the control parameters for the propulsion system 10 during an operating cycle as needed for maintaining a desired level of engine performance.

Accordingly, to efficiently regulate the withdrawal of the propellants, the new and improved propulsion system 10 of the present invention includes a control system, as shown generally at 20, which is cooperatively arranged to monitor selected real-time conditions considered representative of the current performance of the propulsion system 10 while the engine 11 is operating. The control system 20 further includes pressure and temperature transducers 21 and 22 that are cooperatively arranged on the oxygen storage tank 12 to provide direct real-time measurements of conditions considered to be representative of the ongoing status of the oxidizer supply as the rocket engine 11 is operating. Similarly, to monitor the fuel system, the control system 20 includes pressure and temperature transducers 23 and 24 that are arranged on the fuel storage tank 13 for directly measuring the real-time conditions indicative of the ongoing status of the engine fuel supply during the course of a given operational cycle of the rocket engine 11.

As will subsequently be explained in greater detail, in addition to those system parameters respectively obtained by the direct measurements provided by the transducers 21–24, the effective real-time management of the propulsion system 10 also requires the calculation of other system parameters that can not be directly measured. Accordingly, in order to determine the flow rates of the propellants in the oxidizer and fuel lines, typical sonic venturi flow meters 26 and 27 are respectively arranged in the propellant lines 15 and 16. Pressure and temperature transducers 28 and 29 are arranged on the oxidizer line 15 for measuring those two conditions in that flow line during the operation of the rocket engine 11. Similarly, pressure and temperature transducers 30 and 31 are cooperatively arranged on the hydrogen line 16 for monitoring the conditions in the fuel flow line during the operation of the rocket engine 11. Those skilled in the art will, of course, recognize that the pressure and temperature measurements provided by the transducers 28–31 can be used in standard flowmeter characteristic equations with previous flowmeter calibration data for $C_d$ versus Reynolds Number Re for respectively computing the mass flow rates, lbs/sec., of the oxidizer in the flow line 15 and of the fuel in the flow line 16.

In addition to monitoring the above-described propellant conditions, it should be recognized that the effective real-time management of the propulsion system 10 further requires the periodic real-time measurement of one or more parameters which accurately represent the true performance level of the rocket engine 11. Moreover, it will be appreciated that the effective real-time management of the propulsion system 10 also requires selective control of the propulsion system for keeping the engine 11 operating within those predetermined performance limits. In the preferred manner of practicing the present invention, therefore, it has been found that the ambient pressure in the combustion chamber 14 of the engine 11 represents a very reliable indication of the true real-time performance of the engine. Moreover, as will be later described in detail, since the mass flow of propellants that are being supplied to the combustion chamber 14 is directly related to the real-time pressure in that chamber, it is preferred to use that pressure as the controlling indicator of the actual performance level of the rocket engine 11.

Thus, in keeping with the principles of the invention, the control system 20 also includes a pressure transducer 32 which is arranged on the combustion chamber 14 for producing successive real-time output measurements representative of the ongoing performance of the rocket engine 11. Moreover, the control system 20 includes suitable flow control devices such as electronic pressure regulators, as shown at 33 and 34, which are respectively arranged in the oxidizer and fuel lines 15 and 16 to serve as the flow control elements of the propellant system 10 for appropriately regulating the feed pressure of each propellant as the propellants are supplied to the combustion chamber 14.

In the preferred embodiment of the present invention, it has been found particularly advantageous in this service to use electronically-controlled pressure regulators such as those that are manufactured by Marotta Scientific Controls, Inc. of Boonton, N.J. and which have adjustable set points. As depicted in FIG. 1, in addition to having an adjustable set point, control of the feed-pressure regulator 33 in the oxidizer flow line 15 is achieved by connecting one control line (pneumatic) 35 between the oxidizer regulator and the flow line immediately downstream of the pressure regulator as well as another control line (electric) 36 that is connected to the pressure transducer 28. Similarly, selective control of the feed-pressure regulator 34 for the fuel system is provided by a control line 37 that is connected to the fuel line 16 just downstream of the fuel regulator as well as another control line 38 connected to its associated pressure transducer 30.

It will, therefore, be appreciated by those skilled in the art that since the pressure in the flow line 15 at the outlet of the oxidizer regulator is directly controlled by the present level of the control signal or set-point voltage for the electronic flow regulator 33, the mass flow rate of the oxidizer flowing through the venturi flow meter 34 at that time will be directly proportional to the level of that control signal. Similarly, the level of the control signal that is then being applied to the fuel regulator 34 will also be directly proportional to the mass flow rate of the fuel that is flowing through the venturi flow meter 27 at that given time. Moreover, it must be further recognized that the pressure in the combustion chamber 14 is directly proportional to the mass flow rates of the oxidizer and the fuel in the propellant flow lines 15 and 16. Accordingly, in keeping with the principles of the present invention, it must be realized that the pressure in the combustion chamber 14 will be directly controlled by operating the two pressure regulators 33 and 34 to selectively regulate the mass flow of the propellants into the combustion chamber as needed to maintain the rocket engine 11 efficiently operating within its previously-defined performance bounds.

To provide real-time management of the propulsion system 10, the control system 20 includes a central processor unit or a so-called "CPU" 40 including a typical input signal conditioner 41 (such as a multiplexer and an A/D converter) and an output signal conditioner 42 (such as a multiplexer and an A/D converter). The measuring transducers 21–24 and 28–32 are each coupled to the input signal conditioner 41 and arranged for supplying successive real-time measurements of the particular conditions respectively being sensed by those measuring transducers while the rocket engine 11 is operating. Likewise, the output signal conditioner 42 is coupled to the pressure regulators 33 and 34 as well as to the solenoid actuators 43 and 44 of the propellant-isolation valves 17 and 18 for selectively regulating the flow of the propellants to the combustion chamber 14 while the rocket engine 11 is being operated.

To achieve effective real-time management of the new and improved propulsion system 10, performance criteria must, of course, be established in advance for defining acceptable operating parameters for those conditions in the propulsion system which are considered to be indicative of the ongoing consumption of the propellants as well as representative of the most-efficient performance level for the rocket engine 11. Successive real-time measurements must also be made of these selected conditions during the operation of the rocket engine 11. Most of these conditions which are selected for measurement will, of course, be pressures and temperatures; and since they each represent a direct real-time measurement of a selected condition, they may, of course, be directly compared with their associated predetermined parameters in order to appropriately monitor those conditions. It should, however, be realized that other predetermined performance criteria will instead require computations utilizing other real-time measurements of pressures and temperatures for deriving representative parameters (such as mass flow rates and propellant ratios) which can be reliably compared with predetermined performance parameters in order to achieve the effective real-time management of the propulsion system 10.

Accordingly, in order to carry out effective real-time management, the CPU 40 is programmed according to a specific priority system for receiving real-time measurement signals sequentially supplied to the signal conditioner 41 by the transducers 21-29 and 31-32. The various above-mentioned computations and comparisons are performed to determine if the propulsion system 10 is operating in accordance with those predetermined performance parameters. The cycle is, of course, repeated in accordance with the predetermined priority system of the program so long as the propulsion system 10 is operating in accordance with the predetermined performance criteria. If, however, one of the computations or comparisons indicate that some correction is required in the propulsion system 10, the operating program for the CPU 40 functions for supplying appropriate real-time control signals $V_{OX}$ and $V_{HYD}$ by way of the output signal conditioner 42 to the flow control regulators 33 and 34 as necessary to keep the rocket engine 11 efficiently operating as defined by its predetermined performance bounds. In this manner, the CPU 40 functions for cooperatively balancing the propellants as required for optimizing the performance of the rocket engine 11 as well as for assuring the total utilization of both of the propellants until the conclusion of the final mission of the rocket engine.

The output signals from the measuring devices 21-24 and 28-32 will also be evaluated throughout the full operational cycle of the propulsion system 10. The CPU 40 is programmed to cooperatively monitor these signals from the measuring devices 21-24 and 28-32 for guarding against unanticipated variations or changes in the real-time operating conditions in the propulsion system 10. In this manner, the CPU 40 is cooperatively programmed for maintaining the engine 11 at an optimum operating performance level as well as selectively controlling the withdrawal of the bi-propellants from their respective storage tanks 12 and 13 for maintaining a desired consumption ratio of the propellants. It will, of course, be appreciated by those skilled in the art that typically it is preferred to have a consumption ratio in the order of 8:1 (by mass) whenever the propellants are gaseous oxygen and hydrogen, and have been produced from water and stored in that ratio. It will also be recognized that by selectively controlling the mass rate of withdrawals for the oxidizer and the fuel, the two propellants will be consumed at an optimum ratio and thereby the end of the operational cycle will be reached without having significant unused quantities of one propellant because of excessive consumption of the other propellant.

Figure 2:
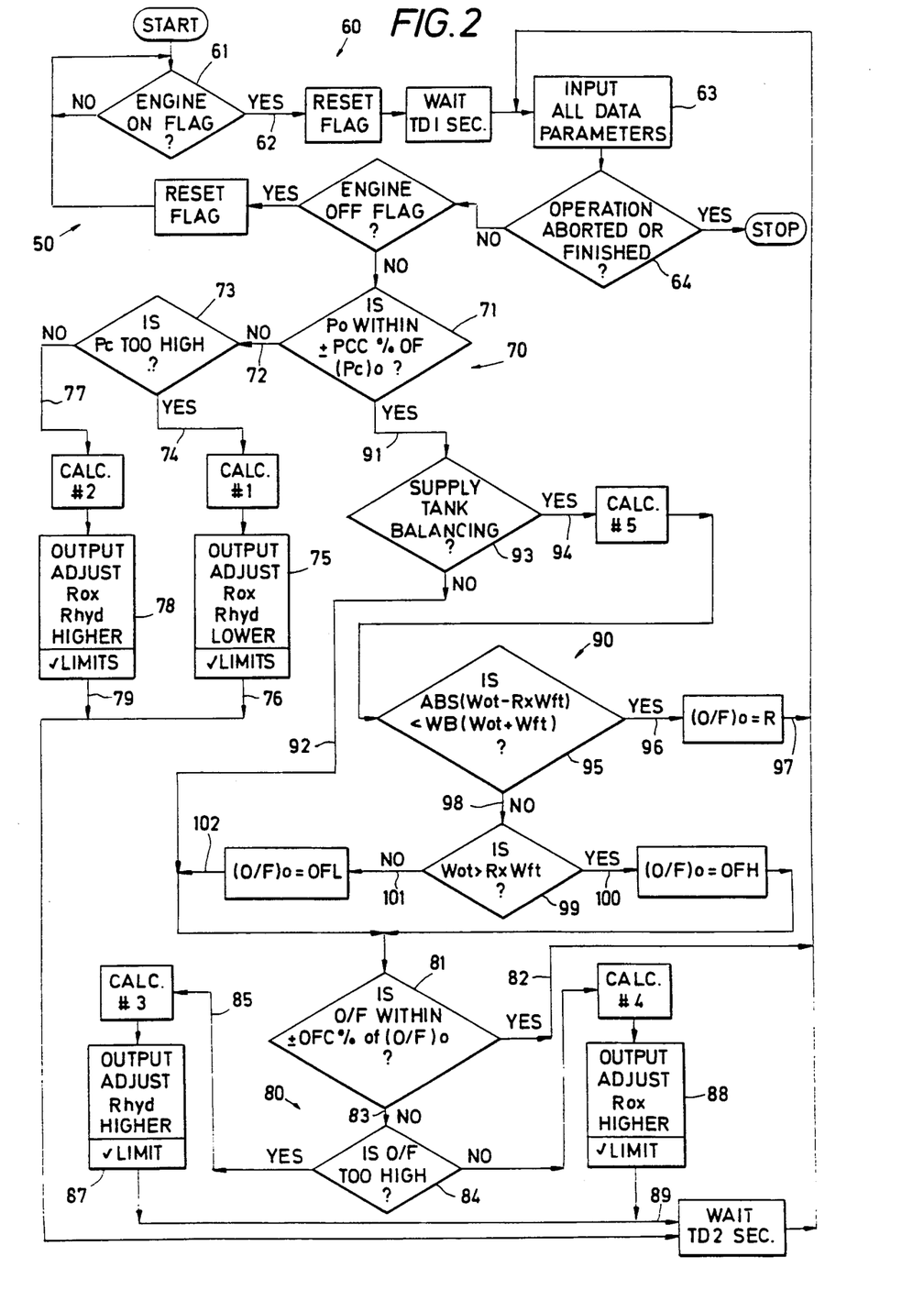
FIG. 2 shows a preferred embodiment of a logic diagram in accordance with the present invention.

Turning now to FIG. 2, a logic diagram 50 is shown for schematically illustrating a preferred mode for providing continuous real-time management of the propulsion system 10 of the present invention. As depicted by the logic diagram 50, effective real-time management of the propulsion system 10 is accomplished by successively comparing the measurement signals representative of the current status of the selected operating conditions described above with their respective predetermined performance parameters which have been chosen for defining acceptable operating limits for each condition.

In keeping with the principles of the present invention, the CPU 40 is cooperatively programmed to continue cycling the monitoring of the various measurement devices 21-29 and 31-32 in accordance with the aforementioned priority system so long as each of these monitored conditions are currently within the parameters of their respective predetermined operating criteria and so long as the rocket engine is operating. When, however, it is found that any of these monitored conditions is no longer in compliance with its predetermined performance parameters, the CPU 40 is cooperatively programmed for determining the extent of this variation by appropriate computations. Corrective signals $V_{OX}$ and $V_{HYD}$ are then produced by the CPU 40 to selectively control the flow-line regulators 33 and 34 for restoring the errant condition to its predetermined parameter and keeping the rocket engine 11 operating at its optimum performance level until it completes its assigned mission. Since the CPU 40 is programmed to continuously monitor the various parameters, it will be appreciated that should, for some unexpected reason, an indicated change not be accomplished immediately, the CPU will subsequently operate to provide the needed change for reliably accomplishing the effective real-time management of the propulsion system 10.

As depicted in FIG. 2, the logic diagram 50 is divided into several discrete tasks, as generally indicated by the arrows 60, 70, 80 and 90 that the CPU 40 is cooperatively programmed to carry out in accordance with the previously-mentioned priority system. The first of the several tasks depicted in the logic diagram 50 is a so-called "ENGINE STATUS TASK" 60 and may be characterized as being a logical procedure provided in the operating software of the CPU 40 for periodically verifying the present operating status of the rocket engine 11. To achieve this verification, the CPU 40 is programmed to respond to a suitable "NO/NO GO" signal which will be supplied to the CPU only so long as the engine 11 is still running. This input signal will, therefore, be effective to provide an internal software indicator or, as illustrated schematically at 61, a so-called "flag" that is included in the "ENGINE STATUS TASK" 60 of the operational software for appropriately directing the forthcoming program steps of the "ENGINE STATUS TASK" in accordance with the present operating status of the engine 11.

As represented by the "YES" branch 62 of the flag 61, the "ENGINE STATUS TASK" 60 will permit input data to be processed by the CPU 40 only so long as the engine 11 is running. As represented by the blocks 63 and 64 in the logic diagram 50, this processing of the input data will continue until such time that an appropriate cut-off signal from one or more monitors or alarm devices (not illustrated in the drawings) is supplied to the input ports of the CPU 40. It will, of course, be appreciated that any of these alarm signals will function (as schematically represented by the decision box 64) to halt the rocket engine 11 when there is either an unexpected termination or a forced abortion of the mission. It will also be realized that an appropriate cut-off signal should also be supplied to the input circuit 41 of the CPU 40 when the mission has finally reached its planned conclusion. It will, of course, be appreciated that the monitoring and controlling of the parameters involving the rocket engine 11 during its startup and its continuing operation will typically be accomplished by a separate engine control system that is not illustrated in FIG. 1; and, except for its interrelation with the real-time management of the propulsion system 10, the particular engine control system is otherwise outside of the scope of the invention.

As previously mentioned, to provide effective real-time management of the propulsion system 10, the aforementioned predetermined priority system is established for performing several computations and then supplying the output signals $V_{OX}$ and $V_{HYD}$ from the output circuit 42 to the propellant flow control regulators 33-34 in accordance with variations in the ambient pressure in the combustion chamber 14 of the rocket engine 11. As shown generally at 70 in FIG. 2, the second discrete programmed task that is illustrated in the logic diagram 50 is a so-called "COMBUSTION CHAMBER PRESSURE CONTROL TASK" which is included in the operating software of the CPU 40 and is assigned the highest priority. The second task 70 is better characterized as a logical procedure for maintaining the ambient pressure in the engine combustion chamber 14 within a predetermined acceptable range for the rocket engine. To achieve this critical control, the CPU 40 is programmed for responding to the real-time measurement signals representative of the present combustion chamber pressure which the pressure transducer 32 is supplying to the input circuit 41 of the CPU 40. These input signals are compared with the predetermined upper and lower limits of a system parameter which define a real-time permissible range of the operating pressure in the combustion chamber 14. Typically, these combustion chamber pressures will be in the order of 90-psia to 100-psia; and, in the practice of the present invention, it is preferred that the software be programmed for defining a permissible range of about 2% of the expected pressure in the combustion chamber 14. Thus, in keeping with the principles of the invention, so long as the pressure in the combustion chamber 14 remains within its permissible range of optimum operating pressures, the CPU 40 will continue its sequential cycle of monitoring the various measurement devices 21-29 and 31-32 in accordance with the aforementioned priority system. Should, however, the actual performance of the rocket engine 11 indicate an unexpected need to modify one of the predetermined parameters in the propulsion system 10, the CPU 40 is uniquely programmed to redefine the predetermined system parameter as considered necessary for insuring that the engine 11 will continue to operate in its most-efficient operating range.

As schematically represented by the decision box 71 in the logic diagram 50, after conducting these above-described initial tests of the "PRESSURE CONTROL TASK" 70, the program steps that are to be subsequently followed in this highest-priority operating task depends entirely upon whether the initial tests indicate that the combustion chamber pressure, $P_C$, is still within its predetermined pressure range at that particular time.

Accordingly, as represented by the "NO" branch 72 from the decision box 60, whenever it is determined that the pressure $P_C$ in the combustion chamber 14 is not currently within its acceptable range of pressure parameters, the measurements from the pressure-measuring transducer 32 are then processed for determining whether the chamber pressure $P_C$ is more or less than a predetermined pressure parameter. As indicated by the decision box 73, the input data from the pressure transducer 32 is compared with the predetermined pressure $(P_C)_o$ which was initially considered to be within the acceptable performance criteria. If, for example, the pressure $P_C$ in the combustion chamber 14 of the engine 11 is more than the predetermined pressure parameter $(P_C)_o$ (as indicated by the "YES" branch 74 from the decision box 73), a correction factor is then determined according to the following calculation:

$$F = 1 - [P_C - (P_C)_o]/(P_C)_o \qquad \text{Calc. 1}$$

where,
 F = Correction Factor
 $P_C$ = Current combustion chamber pressure
 $(P_C)_o$ = Initial target value for combustion chamber pressure Thus, (as indicated by the box 75 in the logic diagram 50) if the pressure $P_C$ in the combustion chamber 14 is found to be greater than the initial allowable parameter $(P_C)_o$ for that pressure, (as indicated by the line 76 from the box 75) appropriate corrective signals $V_{OX}$ and $V_{HYD}$ are sent to the input circuit 41 of the CPU 40 so that it will then function for regulating the control valves 33 and 34 as required to reduce the flow of propellants as well as to proportionally decrease the pressure $P_C$ in the combustion chamber 14 of the rocket engine 11 at that time.

If, however, the pressure $P_C$ in the combustion chamber 14 is found to be less than this predetermined allowable pressure parameter $(P_C)_o$ (as indicated by the "NO" branch 77 from the decision box 73), an appropriate correction factor is found according to the following calculation:

$$F = 1 + [(P_C)_o - P_C]/(P_C)_o \qquad \text{Calc. 2}$$

where,
 F = Correction Factor
 $P_C$ = Current combustion chamber pressure
 $(P_C)_o$ = Initial target value for combustion chamber pressure In this situation, (as indicated by the box 78 in the logic diagram 50) if the pressure $P_C$ in the combustion chamber is lower than the predetermined initial allowable parameter $(P_C)_o$ for that pressure, then (as indicated by the line 79 from the box 78) appropriate corrective signals $V_{OX}$ and $V_{HYD}$ will be sent to the input signal conditioner 41 of the CPU 40 so that the operating program will appropriately regulate the control valves 33 and 34 as needed for increasing the flow of propellants and, thereby, proportionally increasing the pressure $P_C$ in the combustion chamber 14 at that time.

In either case, in carrying out this critical "PRESSURE CONTROL TASK" 70, the Correction Factor F that is obtained from either Calculation 1 or Calculation 2 is operatively utilized in the operating program for the CPU 40 to correct these respective set-point signals $V_{OX}$ and $V_{HYD}$ for selectively adjusting the regulator valves 33 and 34 as necessary to accommodate the change in the pressure in the combustion chamber 14. For example, the initial set-point signal for the electronically-controlled oxidizer regulator 33 will be corrected by multiplying it by the Correction Factor F for defining a new or modified control signal $V_{OX}$ that the CPU 40 will supply to the oxidizer regulator to accomplish the desired pressure change in the combustion chamber 14. The same Correction Factor F is similarly employed as a multiplier to provide a modified or corrective set-point signal $V_{HYD}$ which will be supplied by means of appropriate output signals from the signal conditioner 41 to the fuel regulator 34.

It will, of course, be recognized by those skilled in the art that since the pressure existing at any given time in the combustion chamber is directly proportional to the mass flow rates of the propellants allowed to flow through their respective electronically-controlled regulators 33 and 34, the pressure in the combustion chamber 14 can be readily corrected by simply changing the operating set points for either or both of the propellant pressure regulators. In the practice of the "COMBUSTION CHAMBER PRESSURE CONTROL TASK" 70 of the present invention, the set-point signals for the flow regulators 33 and 34 will typically be limited on the high side by the full-scale rating of the regulators and on the low side by the minimum input pressure (normally $1.2 \times P_C$) required to maintain choked (i.e., sonic) flow in the sonic venturis.

Referring again to FIG. 2, as represented by the "YES" branch 91 from the decision box 71, it will be realized that no action is needed whenever the "PRESSURE CONTROL TASK" 70 finds that the combustion chamber pressure $P_C$ is within an acceptable range of pressure differentials, a decision must be made whether it is advisable to go to the more-important "PROPELLANT CONSUMPTION RATIO TASK" 80 or to go the less-important "PROPELLANT BALANCING TASK" 90 at that time.

As will subsequently be explained in greater detail, the purpose of the fourth or "PROPELLANT BALANCING TASK" 90 in the priority system is to maintain an appropriate balance in the quantities of propellants in the storage tanks 12 and 13 during the operation of the propulsion system 10. Inasmuch as this programmed task 90 is not always necessary, the fourth task is assigned the lowest order of priority in the overall priority system; and the operator is given the full discretion to supply a special initiating signal to starting this lowest-priority task 90 at any time during the operating cycle of the engine 11.

Those skilled in the art will, of course, recognize that the efficient combustion of the gaseous propellants in the rocket engine 11 typically requires that they be consumed in unequal quantities as the engine is operated, with the rate of consumption for each being dependent upon the engine design and the particular propellants being used. For example, when gaseous oxygen and hydrogen are being utilized as the propellants for the rocket engine 11, and when they have been produced by the decomposition of water, a preferred consumption ratio is in the order of 8:1 (by mass) and the engine is especially designed to operate over a range of mixture ratios centered at 8:1. Thus, as illustrated in the logic diagram 50, the third task 80 (the "PROPELLANT CONSUMPTION RATIO TASK") in the operating program of the CPU 40 is the second-most important task in the priority system. This "PROPELLANT CONSUMPTION RATIO TASK" 80 is a major part of the effective real-time management of the propulsion system 10 since regulated withdrawal of unequal quantities of the oxidizer and fuel from their respective storage tanks 12 and 13 is essential in order to attain an efficient consumption ratio of the propellants on the spacecraft.

Assuming that it has been decided to postpone the less-critical fourth task 90 of balancing the bi-propellants in their respective tanks 12 and 13, then (as schematically indicated by the "NO" branch 92 from the decision box 93) this "PROPELLANT CONSUMPTION RATIO TASK" 80 is initiated by comparing real-time parameters for determining whether or not the propellant consumption ratio O/F is then within an acceptable operating range. To make this determination, the output signals respectively provided by the pressure and temperature transducers 30 and 31 located at the inlet of the venturi flow meter 26 in the oxidizer line 15 are then supplied to the input circuitry 41 for being utilized in accordance with programmed equations that are representative of the present flow through the venturi for computing the mass flow rate of the oxidizer $W_O$ at that time. The mass flow rate of the fuel $W_F$ is also computed by utilizing the measurement signals that are being supplied to the input circuitry 41 of the CPU 40 by the pressure and temperature transducers 30 and 31 that are located in the fuel line 16 adjacent to the venturi flow meter 27.

In carrying out the "PROPELLANT COMBUSTION RATIO TASK" 80, the two mass flow rates are correlated by dividing the flow rates to determine the present consumption ratio or mass ratio $W_O/W_F$ which is, of course, the same ratio O/F as previously described. As shown by the decision box 81, the computed consumption ratio O/F is first compared with the allowable predetermined variation of the O/F parameter for determining whether the present ratio is within an allowable range of, for example, ±5% of the preferred 8:1 ratio for oxygen and hydrogen. As indicated by the "YES" branch 82 from the decision box 81, if this comparison shows that the current O/F ratio is within acceptable limits, a control signal representative of that condition is returned to the input circuit 41 of the CPU 40. It will, of course, be realized that so long as these comparisons show that the current O/F ratio is still within its predetermined range of acceptable limits, the program will continue to return to the highest priority level (i.e., the "COMBUSTION CHAMBER PRESSURE CONTROL TASK" 70) so long as the rocket engine 11 is operating.

If, on the other hand, the above-described comparison of the O/F ratio shows that the current O/F ratio is instead not within acceptable limits, then (as indicated by the "NO" branch 83 from the decision box 81 to the decision box 84) in the "PROPELLANT COMBUSTION RATIO TASK" 80 the current O/F ratio is compared with the predetermined set point $(O/F)_O$ for determining if the current O/F ratio is higher or lower than the set point. If the comparison shows the current O/F ratio to be too high, then (as shown by the "YES" branch 85 from the decision box 84) a correction is made by utilizing the following calculation:

$$F = 1 + [(W_O/W_F) - (W_O/W_F)_O]/(W_O/W_F)_O \qquad \text{Calc.3}$$

where,
  F = Correction Factor
  $W_O/W_F$ = Current oxidizer/fuel ratio
  $(W_O/W_F)_O$ = Preset oxidizer/fuel ratio As shown in the logic diagram 50, this correction factor F is then employed to provide a corrective set-point signal $V_{HYD}$ for the fuel regulator 34 that is capable of adequately increasing the flow rate through the fuel line 16 as needed to selectively reduce the current O/F ratio.

If, however, this comparison of the current O/F ratio with the predetermined set point $(O/F)_O$ indicates that the current O/F ratio is significantly below the allowable range for the predetermined pressure parameter, an appropriate correction factor F must be computed. Thus, (as indicated by the "NO" branch 86 from the decision box 84 in the logic diagram 50), to carry out the "PROPELLANT COMBUSTION RATIO TASK" 80, the correction factor F is then computed by the CPU 40 in accordance with the following calculation:

$$F = 1 + [(W_O/W_F)_O - (W_O/W_F)]/(W_O/W_F)_O \quad \text{Calc. 4}$$

where,
 F = Correction Factor
 $W_O/W_F$ = Current oxidizer/fuel ratio
 $(W_O/W_F)_O$ = Preset oxidizer/fuel ratio As depicted in the logic diagram 50, this correction factor F is employed to provide a corrective set point signal $V_{OX}$ for the oxidizer regulator 33 that preferably increases the oxidizer flow rate through the oxidizer line 15.

It should be particularly appreciated from the above description of the "PROPELLANT COMBUSTION RATIO TASK" 80 that, in each of these illustrative situations, the O/F ratio was preferably changed by appropriately increasing the flow of the deficient propellant. Thus, as illustrated by the box 87 in FIG. 2, when the O/F ratio is too high, the Correction Factor F obtained from Calculation 3 is then employed for providing the corrective signals $V_{HYD}$ to adjust the fuel regulator 34 for increasing the flow of fuel and thereby lowering the O/F ratio. In the second illustrative situation, however, as shown by the box 88, the Correction Factor F which was obtained from Calculation 4 was similarly used to provide the corrective signals $V_{OX}$ for adjusting the oxidizer regulator 33 to increase the flow of the oxidizer as needed for raising the O/F ratio. Nevertheless, it is evident that the same Correction Factors F could instead be alternatively utilized for lowering the flow of the surplus propellant whenever it is considered necessary to increase the O/F ratio. Still another way to control the O/F ratio would be to use Calculations 3 and 4 for computing reduced correction factors that would instead be utilized to provide control signals $V_{OX}$ and $V_{HYD}$ of reduced values which (as indicated by the line 89) would be supplied to the CPU 40 for simultaneously adjusting the regulators 33 and 34 to increase the flow of the deficient propellant by a small amount and proportionally decrease the flow of the surplus propellant. The reduced control signals $V_{OX}$ and $V_{HYD}$ would nevertheless still be computed so that the combined effect of the regulators 33 and 34 working together would bring about a desired O/F ratio for effectively optimizing the operation of the engine 11. These two alternatives are, of course, considered to be within the scope of the invention.

As previously mentioned, the "PROPELLANT BALANCING TASK" 90 is involved with balancing the quantities of propellants still remaining in their respective storage tanks 12 and 13 at any time throughout the operating cycle of the propulsion system 10. Inasmuch as it not necessary to carry out this "PROPELLANT BALANCING TASK" 90 on a frequent basis, in the practice of the invention this fourth task has the lowest priority in the priority system depicted in the diagram 50 in FIG. 2. As previously mentioned, it is advisable to have the flexibility of postponing the third task and going directly to the fourth task when the operator believes that it is advisable to initiate this lowest-priority operating task 90. It is, of course, always advisable to conduct this "PROPELLANT BALANCING TASK" 90 from time to time since it is always possible that unexpected pressure losses have taken place in the propulsion system 10. It will be realized that the operating software of the CPU 40 should be programmed to also conduct the "PROPELLANT BALANCING TASK" 90 at regular intervals or in response to the occurrence of a particular alarm signal (not illustrated in the drawings).

Accordingly, the fourth, and the lowest-priority, task 90 of the several operating tasks illustrated in FIG. 2 involves the selective balancing of the propellants which are still remaining in their respective storage tanks 12 and 13 during at different times in the operating cycle of the propulsion system 10. Although this "PROPELLANT BALANCING TASK" 90 has the lowest priority of the several operating tasks depicted in FIG. 2, it will be appreciated that the timely balancing of the quantities of propellants that are still remaining in the storage tanks 12 and 13 at any given time is of major help in providing effective real-time management of the new and improved propulsion system 10.

Since the volumes of the tanks 12 and 13 are known and the propellants are gaseous, the density of each propellant can, of course, be accurately determined by using standard formulas in conjunction with the pressure and temperature measurements respectively provided by the transducers 21-24 on the storage tanks when the "PROPELLANT BALANCING TASK" 90 is carried out. As represented by the "YES" branch 94 from the decision box 93, once the respective densities of the propellants presently contained in the storage tanks 12 and 13 are determined, the mass of each of these propellants are then computed by the following calculations:

$$W_{HT} = V_{FT} \times \text{density of fuel} \quad \text{Calc. 5}$$

$$W_{OT} = VOT \times \text{density of oxidizer}$$

where,
 $W_{HT}$ = Mass of fuel remaining in tank
 $W_{OT}$ = Mass of oxidizer remaining in tank
 $V_{FT}$ = Volume of fuel tank
 VOT = Volume of oxidizer tank Once it is known how much of each propellant remains in the storage tanks 12 and 13, the CPU 40 is programmed (as indicated by the decision box 95) to initially determine whether the remaining propellants can be consumed at an efficient predetermined mixture ratio R (i.e., the ideal value for the O/F ratio) for the remainder of the proposed mission for the engine 11. In other words, in the first step of the "PROPELLANT BALANCING TASK" 90, a computation is made to determine the absolute differential between the mass of the remaining oxidizer and the product of the mass of the remaining fuel times the predetermined mixture ratio R. It will, of course, be recognized that R has the same value as the initial setting for O/F. However, in the practice of the invention, it is preferred that R remain constant and that the setting for O/F be varied as needed to effectively manage the propulsion system 10.

This determination of the absolute differential between the mass of the remaining oxidizer and the product of the mass of the remaining fuel times R can, of course, be made in different ways; but the preferred manner of carrying out the first step of the "PROPEL- LANT BALANCING TASK" 90 is best described by the following equation:

$$W_{OT} - R \times W_{HT} \qquad \text{Eq. 1}$$

where,
R is the ideal consumption ratio (by mass) of the propellants still remaining in the tanks 12 and 13.

It will, of course, be recognized that Equation 1 should ideally be zero; thereby signifying that the oxidizer that is still available in the storage tank 12 at that particular time is just sufficient to match the combustion requirements for the remaining fuel in the storage tank 13 before the two propellants are exhausted. For example, if the propellants being used are oxygen and hydrogen, and the desired consumption ratio is 8:1; Equation 1 simply demonstrates that the computed weight of oxygen $W_{OT}$ in the tank 12 must be eight times the computed weight of hydrogen $W_{HT}$ in the tank 13 if this ideal consumption ratio, R, is to be continued for the remainder of the mission for the rocket engine 11. In other words, if the two sides of Equation 1 are both equal and, therefore, produce a net result of zero, there is a perfect mass balance of those propellants still remaining in the storage tanks 12 and 13 and the priority control system can return the CPU 40 to again repeat the important task 70 of checking the pressure in the combustion chamber 14 of the rocket engine 11.

It will, of course, be recognized that since the purpose of this first step of the "PROPELLANT BALANCING TASK" 90 is to evaluate the interrelationship of the propellants still in the tanks 12 and 13, a more-precise quantitative response is provided by computing the absolute differential between the masses of those propellants remaining in those storage tanks. Moreover, it will be appreciated that since it is immaterial as to which of the two propellants is responsible for any given imbalance, the CPU 40 is programmed so that Equation 1 computes the absolute value of the differential between the left and right-hand portions of the equation when the operating task 90 is being carried out.

Since it can not be reasonably expected to always have a zero response in the first step of the "PROPELLANT BALANCING TASK" 90, the second step of this occasional operating task 90 is to determine whether the present O/F fuel consumption ratio should be modified so that the remaining propellants will be selectively consumed for substantially depleting both of the propellants by the time that the mission of the engine 11 is finally concluded. An estimate of the maximum permissible variation in the propellant consumption Max. $W_{VAR}$ is, therefore, preferably calculated by means of the following equation:

$$\text{Max. } W_{VAR} = WB[W_{OT} + W_{HT}] \qquad \text{Eq. 2}$$

where,
WB is a factor representing the allowable deviation from a perfect mass balance of the propellants still in the storage tanks 12 and 13.

In keeping with the objects of the present invention, it is preferred that the unexpended propellants remaining at the end of the mission of the engine 11 do not exceed about 5% of the total quantity of the propellants remaining at any mid-point in the mission. Thus, an allowable deviation of no more than about 5% would typically be selected for WB.

As shown, therefore, by the decision box 95 in FIG. 2, to conduct the "PROPELLANT BALANCING TASK" 90, the CPU 40 is operatively programmed for comparing the results of Equation 1 and Equation 2 to determine whether there is a significant unbalance in the quantities of the two propellants exceeding the predetermined allowable deviation (e.g., the product of the selected deviation factor WB times the total mass of the remaining propellants). When the comparison of Equations 1 and 2 shows that there is an acceptable or minimal unbalance between the masses of the propellants (i.e., the difference between the two sides of Equation 1 is no greater than the acceptable variation between those propellants remaining in the storage tanks [e.g., the 5% factor], (as shown by the "YES" branch 96) the CPU 40 is programmed for supplying an appropriate control signal (as indicated by the line 97) to the input circuit 41 of the CPU to again repeat the highest-priority task 70.

On the other hand, as indicated by the "NO" branch 98 from the decision box 95, when a comparison of Equations 1 and 2 indicates that there is an unacceptable unbalance exceeding the predetermined deviation (e.g., 5%), the CPU 40 is programmed to determine an appropriate correction to the O/F ratio. This final step of the "SUPPLY TANK BALANCING TASK" 90 is preferably accomplished (as indicated by the decision box 99) by determining whether:

$$W_{OT} > R \times W_{HT} \qquad \text{Eq. 3}$$

Accordingly, as represented by the "YES" branch 100 from the decision box 99, whenever the weight $W_{OT}$ of the remaining oxidizer exceeds the product $R \times W_{HT}$, the CPU 40 provides an appropriate signal OFH indicating that the O/F ratio should be raised. Since one purpose of the "SUPPLY TANK BALANCING TASK" 90 is also to reduce the surplus propellant, it will be noted that the O/F ratio is increased by increasing the mass of the oxidizer that is being supplied to the rocket engine 11. Thus, in addition to increasing the O/F ratio, at least some of the surplus oxidizer in the tank 12 will be consumed in the subsequent operations of the engine 11 so as to hopefully reduce the unacceptable balance of propellants. Conversely, as similarly represented by the "NO" branch 101, whenever the weight $W_{OT}$ of the oxidizer still remaining in the tank 12 is less than the product $R \times W_{HT}$, the CPU 40 functions to instead provide a signal OFL indicating that the O/F ratio must be reduced. Hereagain, by increasing the mass flow of the fuel, some of the surplus fuel in the tank 13 will be subsequently consumed in the rocket engine 11 and the O/F ratio will be decreased. It must also be noted that (as indicated by the line 102) either of the above-described OFH signals or OFL signals will function for initiating the third task in the priority system which is the previously-described "PROPELLANT CONSUMPTION RATIO TASK" 80.

Figure 3:
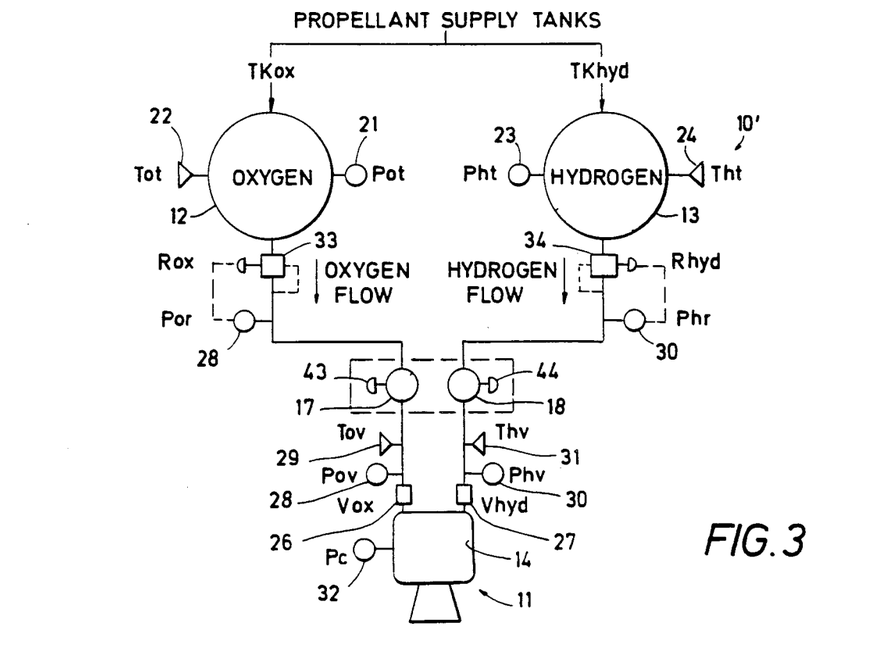
FIG. 3 is a schematic diagram similar to FIG. 1 that depicts a slightly different gaseous-propellant spacecraft system also arranged in accordance with the principles of the present invention.

Turning now to FIG. 3, an alternative arrangement of a modified propellant rocket propulsion system 10' is shown as also being arranged according to the principles of the present invention. It will, of course, be recognized that like the propulsion system 10, this alternative propulsion system 10' is also arranged for supplying a gaseous oxidizer and fuel such as, for example, oxygen and hydrogen to a typical bi-propellant rocket engine 11. Storage tanks 12 and 13 are arranged to store sufficient quantities of the gaseous oxidizer and fuel under appropriate temperature and pressure conditions during a predetermined operating period. The oxidizer tank 12 and the fuel tank 13 are connected to the combustion chamber 14 of the engine 11 by individual flow lines 15 and 16. In the preferred manner of arranging the new and improved propulsion system 10' of the present invention, the solenoid-actuated cut-off valves 17 and 18 are instead respectively installed in the propellant flow lines 15 and 16 between the oxidizer and fuel regulators 28 and 30 and the several measuring devices 26–31. It will, of course, be recognized that this relocation of the cut-off valves 17 and 18 will have no effect upon the operation of the propellant system 10'; and that the operation of this alternate propulsion system 10' will be totally in keeping with the above-described operation of the new and improved propellant system 10.

Accordingly, it will be appreciated that the present invention provides new and improved methods and apparatus for accomplishing effective real-time management of the propulsion system 10 during the operation of a spacecraft rocket engine powered by gaseous propellants. By comparing real-time measurements of selected conditions representative of the current performance of the system with predetermined performance criteria, the propulsion system is selectively controlled for optimizing the performance of the engine as well as for efficiently managing the ongoing consumption of the gaseous propellants throughout the operating cycle of the rocket engine.

In the practice of the invention, a selected priority system is provided for successively comparing measurements representative of the current status of the conditions with the predetermined performance parameters defining acceptable operating limits. When these comparisons indicate that the measured conditions are in accordance with their respective predetermined performance parameters, the priority system will function to continue to monitor those conditions. On the other hand, when one of the monitored conditions is no longer in accordance with its predetermined parameter, the propellant flow regulators are selectively controlled to adjust the propulsion system as appropriate for restoring the errant condition to its predetermined parameter so that the rocket engine 11 will continue operating at a optimum performance level. In the effective real-time management of the propulsion system, the measured conditions are further evaluated in accordance with the predetermined priority system to determine whether the predetermined parameters should be modified from time to time in order to enhance the performance of the propulsion system.

In the disclosed preferred manner of achieving real-time management of the propulsion system 10, the highest priority task is to maintain the pressure in the combustion chamber of the rocket engine within a predetermined range since that pressure is chosen as the preferred indicator of the actual performance level of the engine. The propellant-regulating valves controlling the flow of the gaseous propellants are selectively operated in accordance with timely real-time comparisons of the predetermined performance criteria with measurements of the combustion chamber pressure.

Since the efficient combustion of gaseous propellants requires their consumption in unequal quantities, effective real-time management of the propulsion system 10 regulates the controlled withdrawal of unequal quantities of the two propellants from their respective storage tanks to maintain a predetermined consumption ratio. Accordingly, to control this predetermined ratio, a second operating task of lower priority is conducted for evaluating system parameters for determining whether the present propellant consumption ratio is within an acceptable range. If this evaluation shows that the propellant consumption ratio is within its predetermined allowable operating range, the priority system functions to return the program to its highest-priority task for checking the current pressure in the engine combustion chamber to be certain that the rocket engine is still operating at its optimum performance level. If, however, this programmed evaluation indicates that the current propellant consumption ratio is not within acceptable limits, the propellant valves are appropriately regulated to maintain a predetermined consumption ratio.

Since the gaseous propellants are withdrawn in unequal quantities from their respective storage tanks to maintain a predetermined consumption ratio, the effective real-time management of the propulsion system 10 requires that another and lower-priority operating task be conducted for balancing the quantities of the propellants remaining in the storage tanks from time to time. Once it is determined how much of each propellant remains in the storage tanks, to effectively manage the propulsion system 10, a computation is made for determining whether the remaining propellants can still be consumed at the present combustion ratio for the remainder of the proposed mission for the rocket engine. If this computation shows that there is a significant unbalance in the quantities of the remaining propellants which exceeds the predetermined allowable deviation, the propellant valves are appropriately regulated for modifying the present fuel consumption ratio so that the remaining quantities of the propellants will be selectively consumed in such a manner that the engine will be operated within its selected operating conditions and that the propellants will both be substantially depleted when the mission of the engine 11 is finally concluded. In any case, the operating software for the CPU 40 is arranged for sequentially cycling these several operating tasks in accordance with their respective predetermined priority levels.

While only a particular embodiment of the apparatus of the present invention has been shown and described herein, it is apparent that various changes and modifications may be made to the above-described methods and apparatus without departing from the broader aspects of this invention; and, therefore, the aim in the appended claims is to cover all changes and modifications that fall within the true spirit and scope of this invention.

It would be within the scope of this invention for multiple propulsion systems, each fully and independently equipped and operated as described heretofore to operate while sharing a common set of oxygen and hydrogen storage tanks 12 and 13 and the associated tank temperature and pressure sensors 22, 24, 23, and 21.

It would be considered within the scope of this invention to incorporate additional rocket engines, performance matched to the original, and sharing all elements of the propulsion system except that each would have its own chamber pressure measurement and propellant isolation valves. Said additional engines would operate in sychronized fashion, on the same On-Off duty cycle. In such a case, any selectable engine would provide the chamber pressure measurement for the required calculations and other selectable engines would merely be operated to provide redundancy and additional propulsive thrust as required.

What is claimed is:

1. A method for selectively controlling a propulsion system to efficiently supply gaseous propellants to a rocket engine and comprising the steps of:

defining selected operating ranges for the combustion chamber pressure as well as the propellant consumption ratio which are respectively representative of the efficient operation of the rocket engine;

obtaining succussive real-time measurements of the combustion chamber pressure as well as successive real-time measurements of the mass flow rate of each of the gaseous propellants being supplied to the combustion chamber of the rocket engine;

periodically correlating successive real-time measurements of the combustion chamber pressure for determining whether said successive measurements are within the selected operating range for the combustion chamber pressure and correspondingly adjusting the mass flow rates of the gaseous propellants as needed for maintaining the combustion chamber pressure within its selected operating range;

periodically correlating successive real-time measurements of the mass flow rates of the gaseous propellants for determining whether the current propellant consumption ratio is within the selected operating range for the propellant consumption ratio and then correspondingly adjusting the mass flow rates of the gaseous propellants as needed for maintaining the propellant consumption ratio within its selected operating range wherein said step of correlating said successive real-time measurements of the mass flow rates of the gaseous propellants is carried out only so long as the rocket engine is operating within a selected operating range of combustion chamber pressures; and whenever one of said correlations indicates that one of said selected operating ranges must be modified to maintain the rocket engine operating efficiency, computing a correction factor required for adjusting the mass flow rate of at least one of the gaseous propellants to return the rocket engine to its predetermined level of efficiency and thereafter modifying the mass flow rate of at least said one gaseous propellant to subsequently operate the rocket engine efficiently within a new selected operating range of combustion chamber pressures.

2. The method of claim 1 further including the step of:

defining a priority system for said steps of correlating said real-time measurements so that said step of correlating said successive real-time measurements of the mass flow rates of the gaseous propellants will be carried out only so long as the rocket engine is operating within a selected operating range of combustion chamber pressures.

3. The method of claim 1 wherein the gaseous propellants are oxygen and hydrogen and said selected range of propellant consumption ratios is in the order of eight parts to one part.

4. The method of claim 1 wherein the adjustments of said mass flow rates of the gaseous propellants are carried out by selectively regulating the pressure of the gaseous propellants to the feed pressure required for supplying the needed mass flow rates of gaseous propellants to the combustion chamber of the rocket engine.

5. The method of claim 1 further including the steps of:

determining the mass of the available quantities of gaseous propellants respectively remaining in the propulsion system;

comparing the mass of the available quantities of each of the gaseous propellants with the mass of each of the propellants required for subsequently consuming the gaseous propellants substantially in accordance with said selected operating range for the propellant consumption ratio; and when said comparison of said available quantities of each of said gaseous propellants shows there is a potential surplus of one of said propellants, regulating the mass flow rate of said one gaseous propellant for increasing its said mass flow rate so that it will be subsequently consumed at a higher rate for correspondingly reducing said potential surplus of said one propellant before the final operation of said rocket engine.

6. The method of claim 5 wherein the mass flow rate of said one gaseous propellant is increased to reduce its said surplus but without allowing said ratio of mass flow rates to exceed the predetermined upper limit or to be less than the predetermined lower limit of said selected operating range for the propellant consumption ratio.

7. The method of claim 6 wherein said mass flow rate of said one gaseous propellant is regulated so that it will be decreased when a subsequent comparison is made of the still-available quantities of said gaseous propellants which are still remaining in said propulsion system with said selected operating range for the propellant consumption ratio and said subsequent comparison indicates there is no longer a potential surplus of said one gaseous propellant.

8. The method of claim 6 wherein said mass flow rate of said one gaseous propellant is regulated so that it will be decreased when a subsequent comparison is made of the still-available quantities of said gaseuous propellants which are still remaining in said propulsion system with said selected operating range for the propellant consumption ratio and said subsequent comparison indicates that there is no longer a potential surplus of said one gaseous propellant and the ratio of said mass flow rates of said gaseous propellants is again substantially equal to said selected operating range for the propellant consumption ratio.

* * * * *